(12) United States Patent
Gandolfi et al.

(10) Patent No.: US 11,517,928 B2
(45) Date of Patent: Dec. 6, 2022

(54) APPARATUS FOR COATING BULK MATERIAL AND INCLUDING A MATERIAL DISCHARGE REGULATOR

(71) Applicant: I.M.A. INDUSTRIA MACCHINE AUTOMATICHE S.P.A., Ozzano dell'Emilia (IT)

(72) Inventors: Nicola Gandolfi, Ozzano dell'Emilia (IT); Gjergj Darragjati, Ozzano dell'Emilia (IT)

(73) Assignee: I.M.A. INDUSTRIA AUTOMATICHE S.P.A.

( * ) Notice: Subject to any disclaimer, the term of this patent is extended or adjusted under 35 U.S.C. 154(b) by 34 days.

(21) Appl. No.: 16/610,154

(22) PCT Filed: May 2, 2018

(86) PCT No.: PCT/IB2018/053022
§ 371 (c)(1),
(2) Date: Nov. 1, 2019

(87) PCT Pub. No.: WO2018/203240
PCT Pub. Date: Nov. 8, 2018

(65) Prior Publication Data
US 2020/0070193 A1      Mar. 5, 2020

(30) Foreign Application Priority Data
May 3, 2017   (IT) .................. 102017000047415

(51) Int. Cl.
*B05B 13/02* (2006.01)
*A61J 3/00* (2006.01)
(Continued)

(52) U.S. Cl.
CPC ........ *B05B 13/0257* (2013.01); *A23G 3/0205* (2013.01); *A23G 3/26* (2013.01);
(Continued)

(58) Field of Classification Search
CPC .......... A23G 3/26; A23P 20/18; A61J 3/0006; B05B 13/0257; B05C 3/08
See application file for complete search history.

(56) References Cited

U.S. PATENT DOCUMENTS 3,934,545 A * 1/1976 Schady .............. A23G 3/26
                                                    118/19
3,988,133 A * 10/1976 Schady .................. B01D 45/12
                                                    55/459.1
(Continued)

FOREIGN PATENT DOCUMENTS

CN      102307483 A    1/2012
CN      103037701 A    4/2013
(Continued)

*Primary Examiner* — Karl Kurple
(74) *Attorney, Agent, or Firm* — Laubscher & Laubscher PC

(57) ABSTRACT

A coating apparatus and a method are disclosed for coating tablets in a rotating drilled container at the outlet of which a rotating annular element operates that is coaxial with the container, in which in an initial transition phase the annular element rotates in a direction that is opposite the rotation direction of the container to retain the tablets inside the container, forming a bed of tablets until a desired level is reached, and in a stationary phase the annular element rotates in a direction that is the same as the rotation of the container to permit the exit of the tablets, until the quantity of tablets entering the container is the same that the quantity exiting.

7 Claims, 12 Drawing Sheets

(51) Int. Cl.
*A23P 20/13* (2016.01)
*B05C 3/08* (2006.01)
*A23P 20/18* (2016.01)
*A23G 3/26* (2006.01)
*B01J 2/00* (2006.01)
*A23G 3/02* (2006.01)
*A61J 3/06* (2006.01)

(52) U.S. Cl.
CPC .............. *A23P 20/13* (2016.08); *A23P 20/18* (2016.08); *A61J 3/005* (2013.01); *B01J 2/006* (2013.01); *B05C 3/08* (2013.01); *A61J 3/06* (2013.01)

(56) References Cited

U.S. PATENT DOCUMENTS

| | | | |
|---|---|---|---|
| 4,465,017 A | 8/1984 | Simmons | |
| 4,979,830 A * | 12/1990 | Munn | B01F 11/0082 366/102 |
| 5,433,964 A | 7/1995 | Norman et al. | |
| 5,531,826 A * | 7/1996 | Fusejima | A23G 3/26 118/19 |
| 5,721,012 A | 2/1998 | Long, Jr. et al. | |
| 5,937,744 A * | 8/1999 | Nothum, Sr. | A23L 13/03 99/494 |
| 6,158,332 A * | 12/2000 | Nothum, Sr. | A23G 3/2076 118/13 |
| 8,323,711 B2 * | 12/2012 | Brandt, Jr. | A23P 20/15 426/305 |
| 8,978,576 B2 * | 3/2015 | Brandt, Jr. | A23G 7/02 118/19 |
| 2006/0124053 A1 * | 6/2006 | Trebbi | A23G 3/26 118/13 |
| 2007/0275163 A1 * | 11/2007 | Dunaitschik | A23G 3/0095 427/242 |
| 2008/0193632 A1 | 8/2008 | O'Hara et al. | |
| 2009/0092752 A1 * | 4/2009 | Brandt, Jr. | A23N 12/10 118/19 |
| 2011/0197810 A1 | 8/2011 | Fusejima et al. | |
| 2011/0287166 A1 * | 11/2011 | Dunajtschik | A23G 3/0095 426/665 |
| 2012/0015085 A1 | 1/2012 | Liberatore | |
| 2013/0055907 A1 * | 3/2013 | Brandt, Jr. | A23G 4/025 99/516 |
| 2013/0142924 A1 | 6/2013 | Liberatore | |
| 2013/0251901 A1 * | 9/2013 | Loucks | B01J 2/006 118/612 |

FOREIGN PATENT DOCUMENTS

| | | |
|---|---|---|
| CN | 103350038 A | 10/2013 |
| GB | 789964 | 1/1958 |
| JP | S6214935 A | 1/1987 |
| WO | 2016046781 A1 | 3/2016 |

* cited by examiner

APPARATUS FOR COATING BULK MATERIAL AND INCLUDING A MATERIAL DISCHARGE REGULATOR

CROSS-REFERENCE TO RELATED APPLICATIONS

This application is a § 371 National Stage entry of PCT International Application No. PCT/IB2018/053022 filed May 2, 2018. PCT/IB2018/053022 claims priority of Italian Application No. IT 102017000047415 filed May 3, 2017. The entire content of these applications is incorporated herein by reference.

BACKGROUND OF THE INVENTION

The invention relates to an apparatus and a method for coating bulk material, in particular for coating material in the form of granules, pellets, tablets, pills, capsules, particles etc, with at least one layer of coating material.

Specifically, but not exclusively, the invention can be applied to coat pharmaceutical products (for example tablets) or food products, in particular to produce tablets coated with film.

It is known to form the coating of pharmaceutical tablets inside a drilled pan, with a circular or polygonal section, rotated on its longitudinal axis in order to move the mass of the tablets, inside which at least one gun is arranged that sprays the coating material.

It is also known to generate a flow of gas (treated air) that is forced from the exterior to the interior of the pan, passing through the holes and the mass of the tablets, to perform drying, heating and cooling according to process needs.

Plants are known that work in batch mode, with a product loading step, in which the pan is filled with the desired quantity of tablets, a product coating step, and a discharge step until the pan is completely emptied.

Plants are also known that work in continuous mode, in which the product moves without interruption from a loading zone, where the product enters the pan, to a discharge zone.

In continuous mode, a stationary phase exists, in which the mass of the processed product is more or less constant (some enters the pan, some is processed, some exits) and two transition phases, a start or filling step, in which there is a transition from pan empty status to stationary production status and another switching off or emptying status, in which the opposite occurs.

Patent publication US 2008/0193632 A1 shows a coating apparatus in which a rotating drum has an inlet and an outlet for the tablets and a rotating adjustable weir partially obstructs the outlet so as to maintain a bed of tablets in the drum at a set depth.

Patent publication US 2006/124053 A1 shows a coating apparatus according to the preamble of claim 1.

One of the problems of the prior art is to ensure correct movement of the product, in particular in the transition steps, for example to ensure sufficient stay of the product in the start or filling step and/or a rapid outflow of the product in the step of switching off or emptying.

Another problem is treating the product being processed with extreme delicacy, to avoid damage to the product or to the coating thereof, whilst maintaining high productivity in the coating process.

SUMMARY OF THE INVENTION

One object of the invention is to devise a coating apparatus that is able to solve one or more of the aforesaid problems of the prior art.

One object of the invention is to devise a coating method that is able to solve one or more of the aforesaid problems of the prior art.

One advantage is to permit simple and effective regulation of the flow of the bulk material during the coating process.

One advantage is obtaining particularly gentle handling of the bulk material, both in the transition phases and in the stationary phase.

One advantage is ensuring correct handling of the product, in particular ensuring sufficient duration of the product in the start step and/or a rapid outflow of the product during the switching-off step One advantage is providing an apparatus and/or a method that is suitable for continuous production or for discontinuous (batch) production.

One advantage is to give rise to a coating apparatus that is constructionally simple and cheap.

Such objects and advantages and still others are achieved by an apparatus and/or by a method according to one or more of the claims set out below.

In one embodiment, a coating apparatus, suitable for coating bulk or loose material in the form of granules, pellets, tablets, pills, capsules, particles, etc., comprises a rotating container, where the bulk material is coated with coating material, and a rotating regulating element arranged at the outlet of the rotating element, in which, in an initial transition phase the regulating element is rotated in a direction opposite the rotation of the container to retain the tablets inside the container such as to form a bed of tablets until a desired level is reached, and in a stationary phase the regulating element is rotated in the same direction as the rotation of the container to permit the exit of the tablets from the container so that the flow of tablets entering the container is the same as the flow of tablets exiting the container.

BRIEF DESCRIPTION OF THE DRAWINGS

The invention can be better understood and implemented with reference to the attached drawings that illustrate some embodiments thereof by way of non-limiting examples, in which.

DETAILED DESCRIPTION

With reference to the aforesaid figures, analogous elements of different embodiments have been indicated, for the sake of greater clarity and simplicity, by the same numbering. Overall, by 1 a coating apparatus has been indicated that is usable for coating bulk or loose material, in particular material in the form of granules, pellets, tablets, pills, capsules, particles, etc.

The apparatus 1 may be used, for example, to coat pharmaceutical products (for example tablets) and/or food products. The coating may comprise at least one layer of coating material such as, for example, a coating of polymer film that is suitable for coating pharmaceutical tablets. The apparatus 1 may be used, in particular, to produce tablets coated with film.

The coating apparatus 1 comprises a first container 2 that can receive and discharge bulk material M. The first container 2 may be of tubular shape, for example with a circular or polygonal section. The first container 2 may rotate, (around a first rotation axis X1) to promote the movement of the bulk material M. The first container 2 may rotate, for example, around its own longitudinal axis.

The first container 2 may comprise a first inlet 3 and a first outlet 4 of the bulk material M. The first inlet 3 and the first outlet 4 are arranged at two opposite ends of the first container 2. The first container 2 may rotate with a first horizontal or tilted rotation axis to promote the mixing of the bulk material and/or the transit of the bulk material from the first inlet 3 to the first outlet 4. The tilt of the first container 2 may be adjustable.

It is possible, as in these embodiments, for at least one part of the first container 2 to be permeable to a process gas (treated air) to process the bulk material M in the first container 2. In particular, the first container 2 may be drilled to permit the process gas to pass through, retaining the bulk material.

The coating apparatus 1 may comprise, in particular, a process gas supplying arrangement (for example of known type) configured for supplying the gas through the first container 2 and thus through the bulk material M contained in the first container 2. The process gas may be suitable, in particular, for drying, heating or cooling the bulk material, or for performing other types of treatment.

Figure 13:
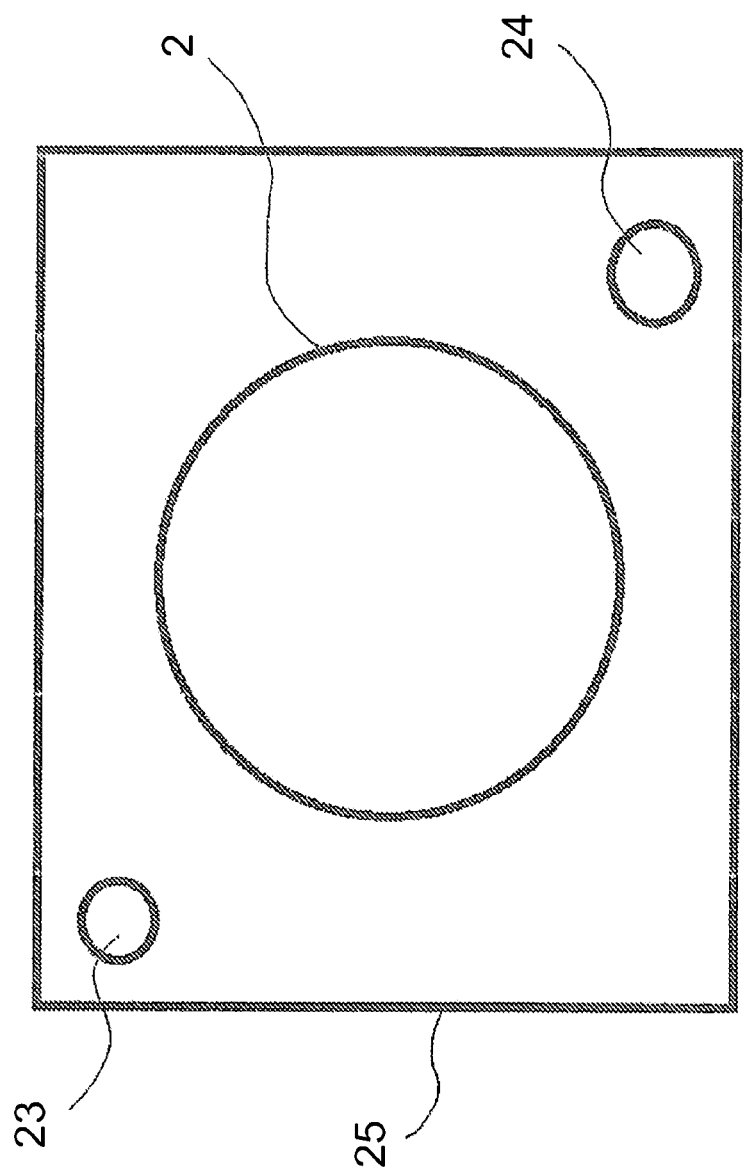
FIG. 13 is a frontal view in a vertical elevation of a third embodiment of a coating apparatus to show schematically the arrangement of the process gas inlet and outlet.

The process gas may, as in this embodiment, enter or exit the front end of the apparatus (for example on the side of the first inlet 3 or on the side of the first outlet 4). The apparatus may comprise, in particular, an air inlet 23 and an air outlet 24 situated (for example on a casing 25 that encloses the first container 2) in opposite (for example diametrically opposite) positions with respect to the rotation axis of the first container 2. In this embodiment the air inlet 23 and the air outlet 24 are arranged obliquely (in particular at 45°), i.e. an imaginary line that joins the air inlet 23 and the air outlet 24 is oblique, forming an angle (of about 45°) with a vertical axis passing through the rotation axis of the first container 2. In particular, (with reference to FIG. 13) the two openings (i.e. the air inlet 23 and the air outlet 24) are arranged on the two opposite lateral sides of the first container 2, one higher up and the other lower down, with a set tilt with respect to the rotation direction of the first container 2, i.e. in such a manner that the higher opening is arranged on the part of a side of the first container 2 that rotates downwards and the lower opening is arranged on the opposite side, i.e. on a side of the first container 2 that rotates upwards. In this specific embodiment, the air inlet 23 is situated at the top and the air outlet 24 is situated at the bottom. In operation, the flow of process gas (treated air) is pushed in a forced manner from the outside to the inside of the drilled first container 2 and then from the inside to the outside, passing through the holes and the mass of the tablets.

The coating apparatus 1 may comprise, as in these embodiments, a supply portion A arranged to receive the bulk material M from the outside and direct the bulk material to the first inlet 3 of the first rotating container 2. The supply portion A (for example of known type) may be fixed and arranged contiguously to the end of the first container 2 where the first inlet 3 is situated.

The coating apparatus 1 comprises a first dispensing device 5 (for example of known type) for dispensing coating material on the bulk material M contained in the first container 2. The first dispensing device 5 may comprise, in particular, one or more nozzles arranged (aligned) inside of the first container 2 to spray the coating material.

The coating apparatus 1 comprises a second container 6 arranged serially downstream of the first container 2. The second container 6 may be of tubular shape, for example with a circular or polygonal section. The second container 6 may be shaped and arranged to receive the bulk material M coming from the first container 2 and to discharge the bulk material M, for example to possible subsequent processes to be performed on the material. The second container 6 may rotate (around a second rotation axis X2) to promote the movement of the bulk material M in the second container 6. The second container 6 may rotate, for example, around its own longitudinal axis.

It is possible, as in this embodiment, for at least one part of the second container 6 to be permeable to a process gas (treated air) to process the bulk material M in the second container 6. In particular, the second container 6 may be drilled to permit the transit of the process gas but not the transit of the bulk material M.

The coating apparatus 1 may comprise, in particular, a process gas supplying arrangement configured for supplying the process gas through the second container 6 and thus through the bulk material M contained in the second container 6. The process gas may be suitable, in particular, for drying, heating or cooling the bulk material, or for performing other types of treatment.

Figure 11:
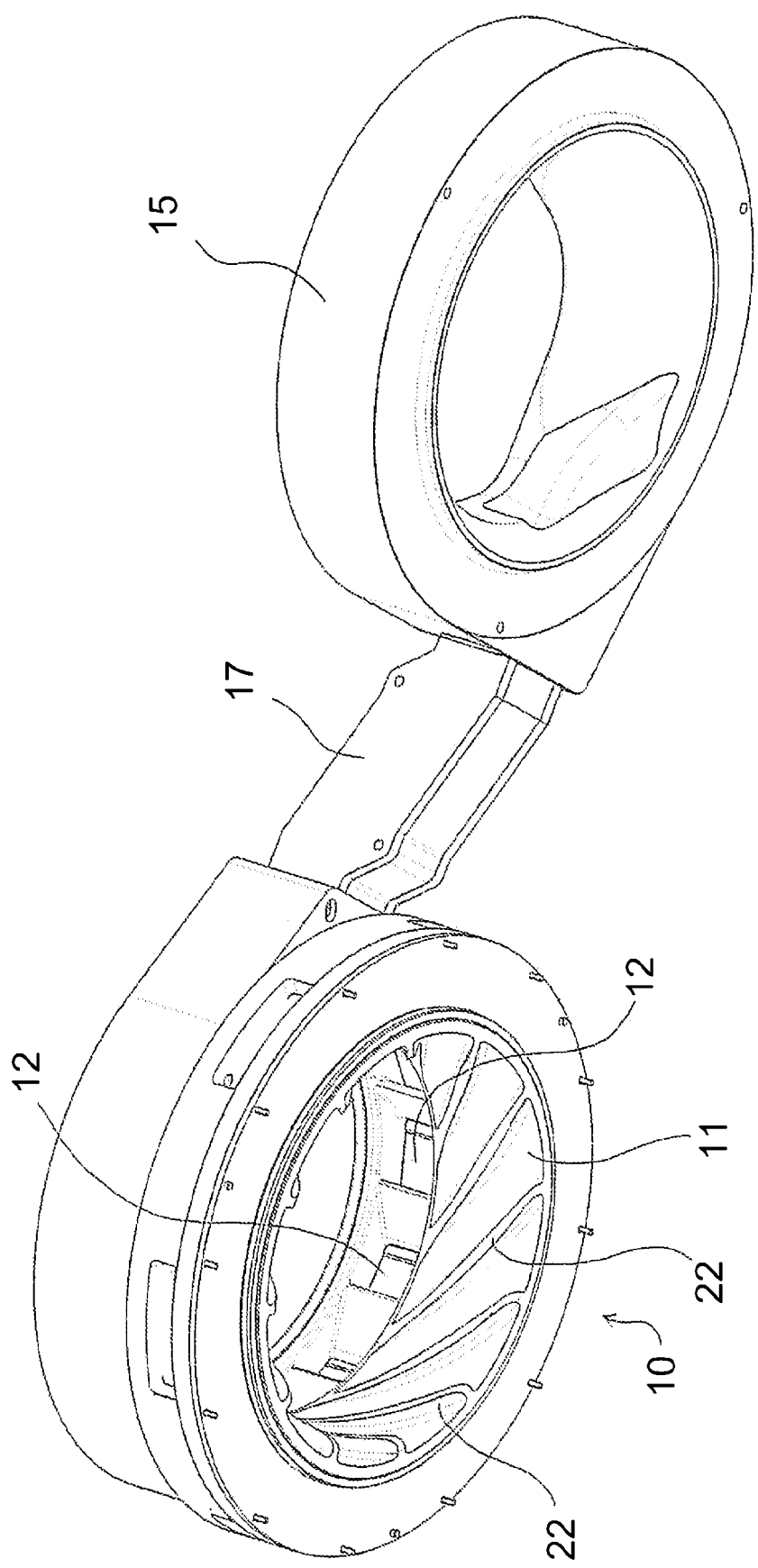
FIG. 11 is a perspective view of the zone of the apparatus in FIG. 3 in which the bulk material is transferred from the outlet of the first rotating container to the inlet of the second rotating container.
Figure 12:
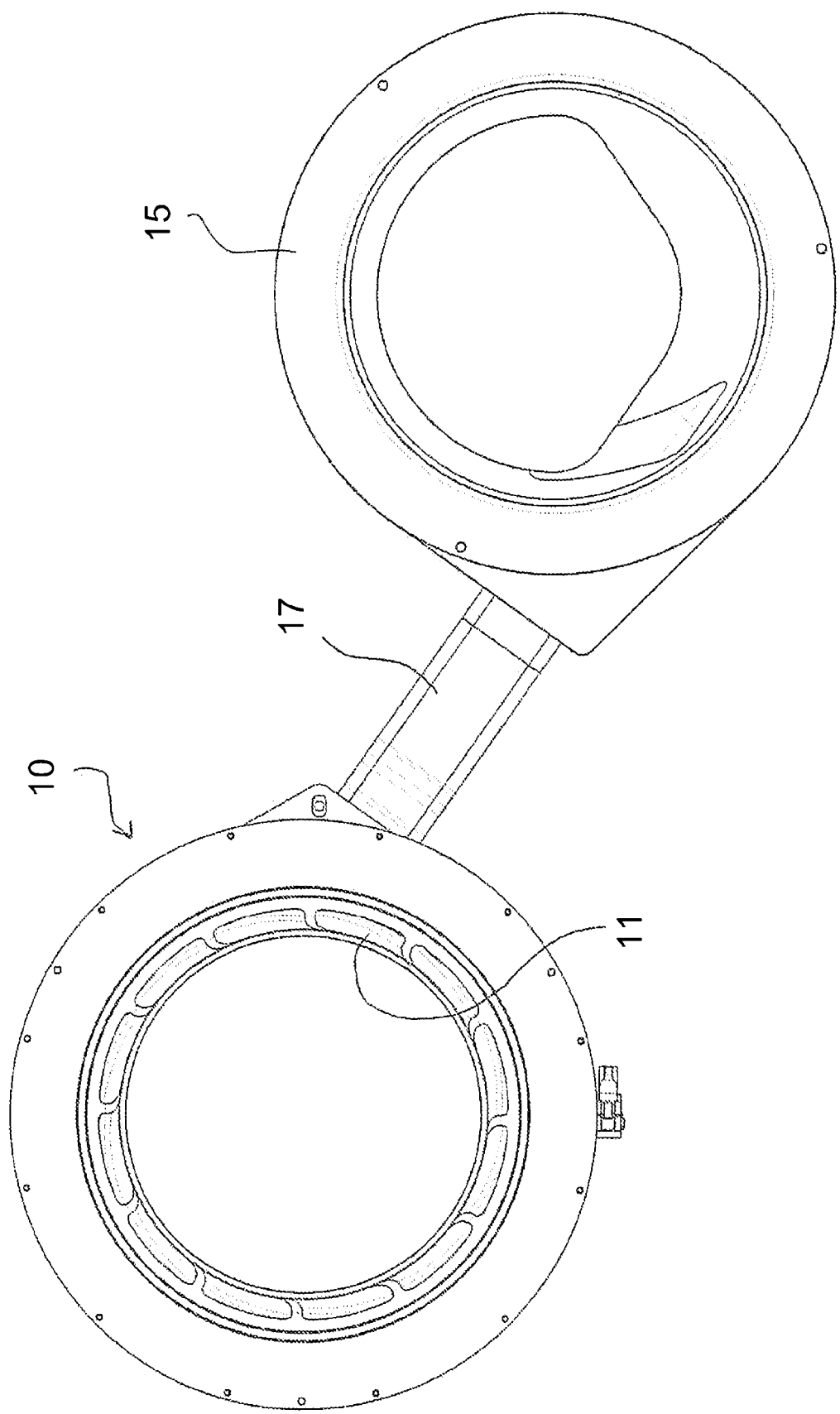
FIG. 12 is a frontal view in a vertical elevation of the zone of FIG. 11.

The second container 6 may comprise a second inlet 7 and a second outlet 8 of the bulk material M. The second inlet 7 and the second outlet 8 may be arranged at two opposite ends of the second container 6. As FIGS. 11 and 12 show, with the second container 6 a supply portion 15 (fixed, arranged coaxially to the second container 6 and contiguously to the end of the second container 6 that has the second inlet 7) may be associated that is suitable for guiding the entry of the material. The second container 6 may rotate around a second horizontal or tilted rotation axis to promote mixing of the bulk material M and/or the transit of the bulk material M from the second inlet 7 to the second outlet 8. The tilt of the second container 6 may be adjustable.

Figure 1:
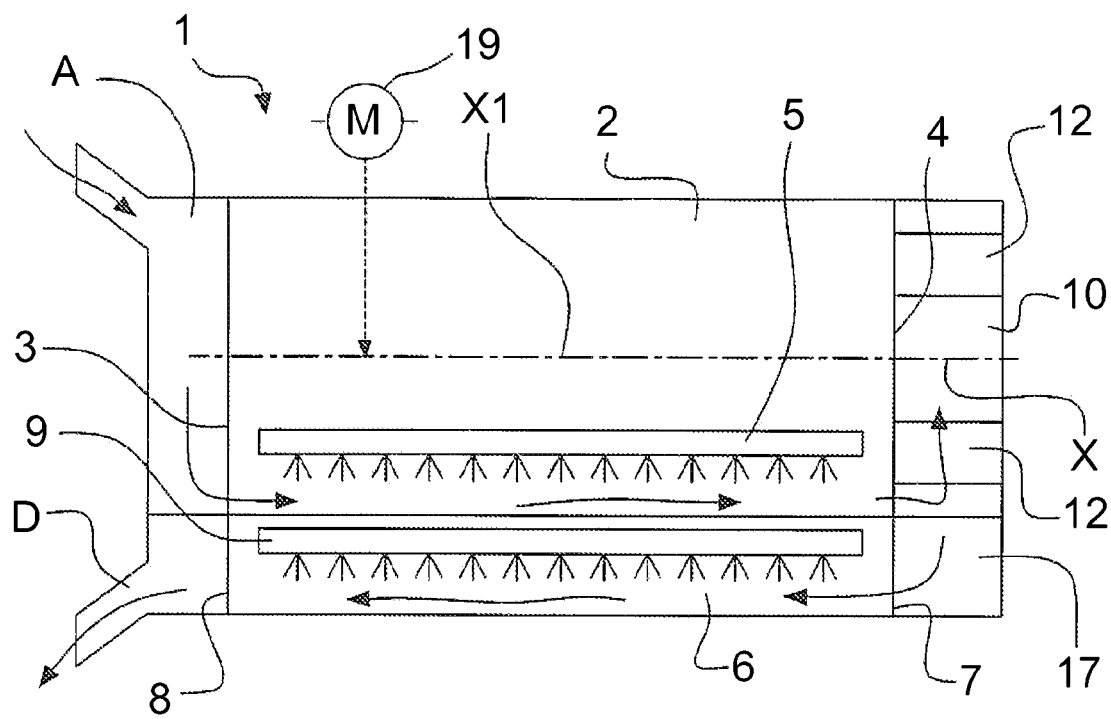
FIG. 1 is a side view of a diagram of a first embodiment of a coating apparatus made according to the invention.
Figure 2:
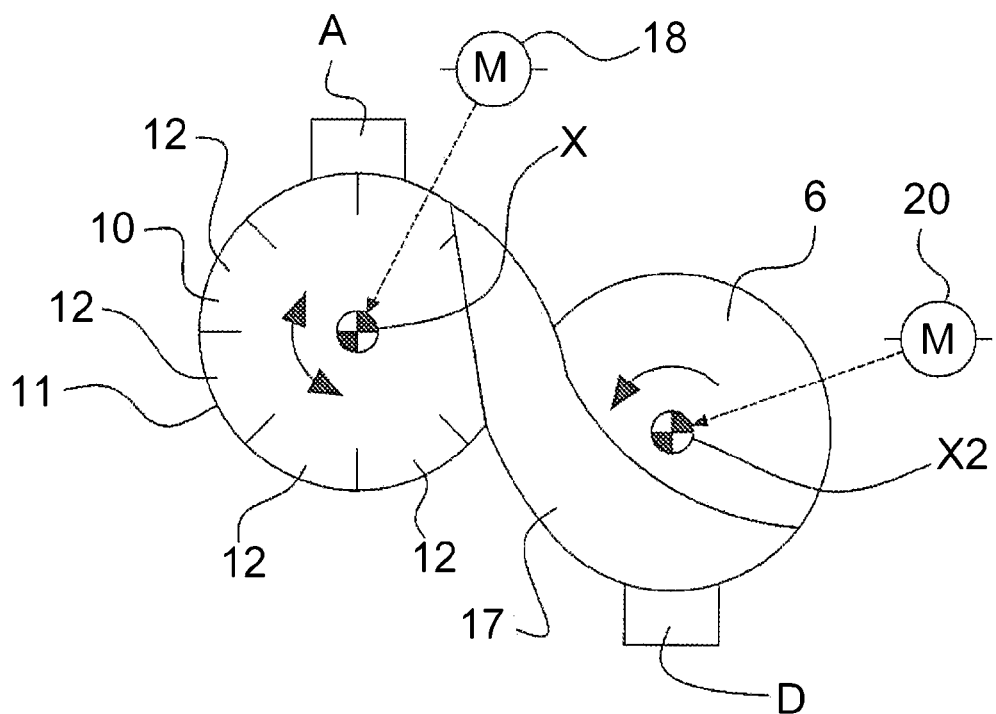
FIG. 2 is a view from the right of FIG. 1.
Figure 3:
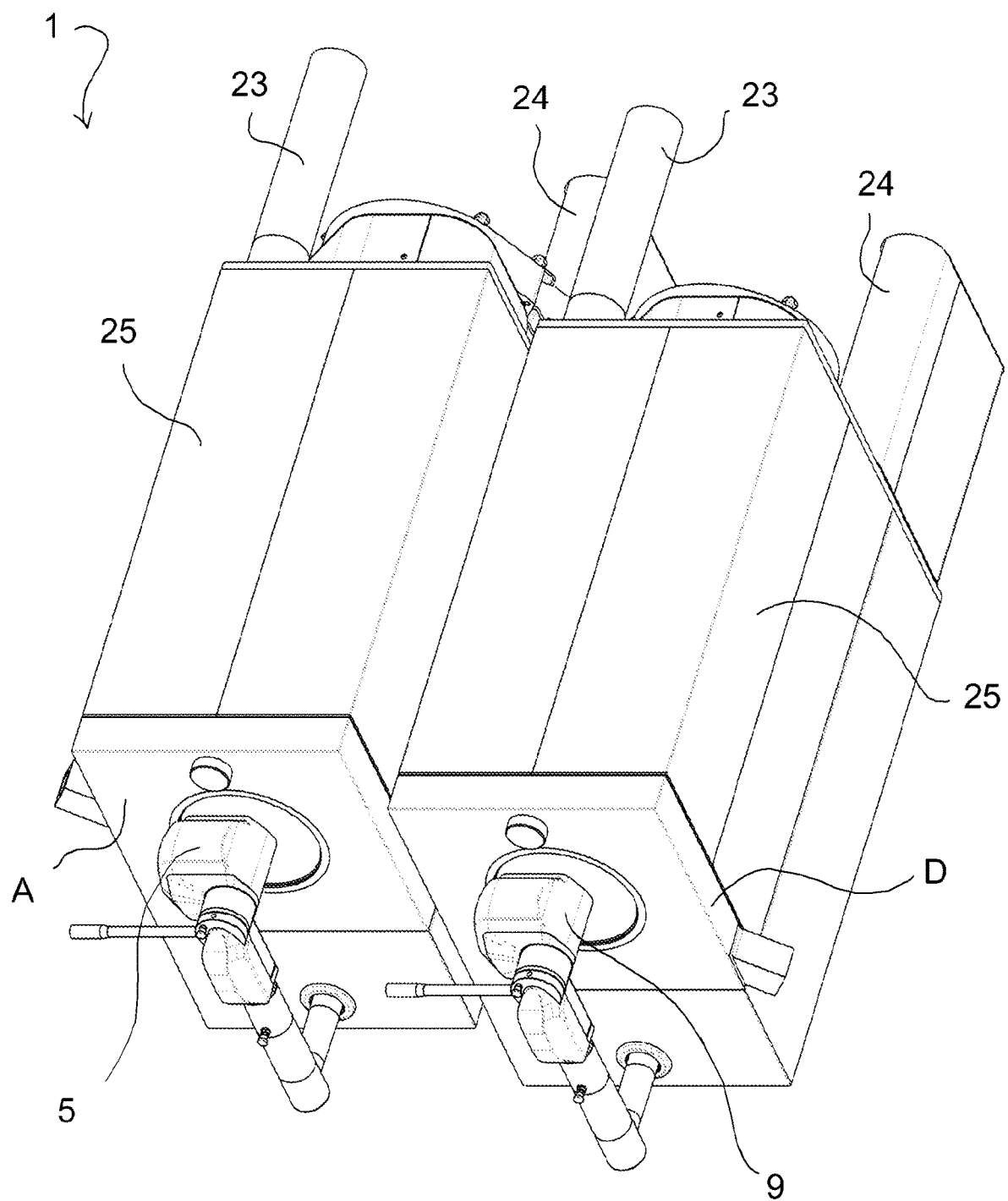
FIG. 3 is a perspective top view of a second embodiment of a coating apparatus made according to the invention.
Figure 4:
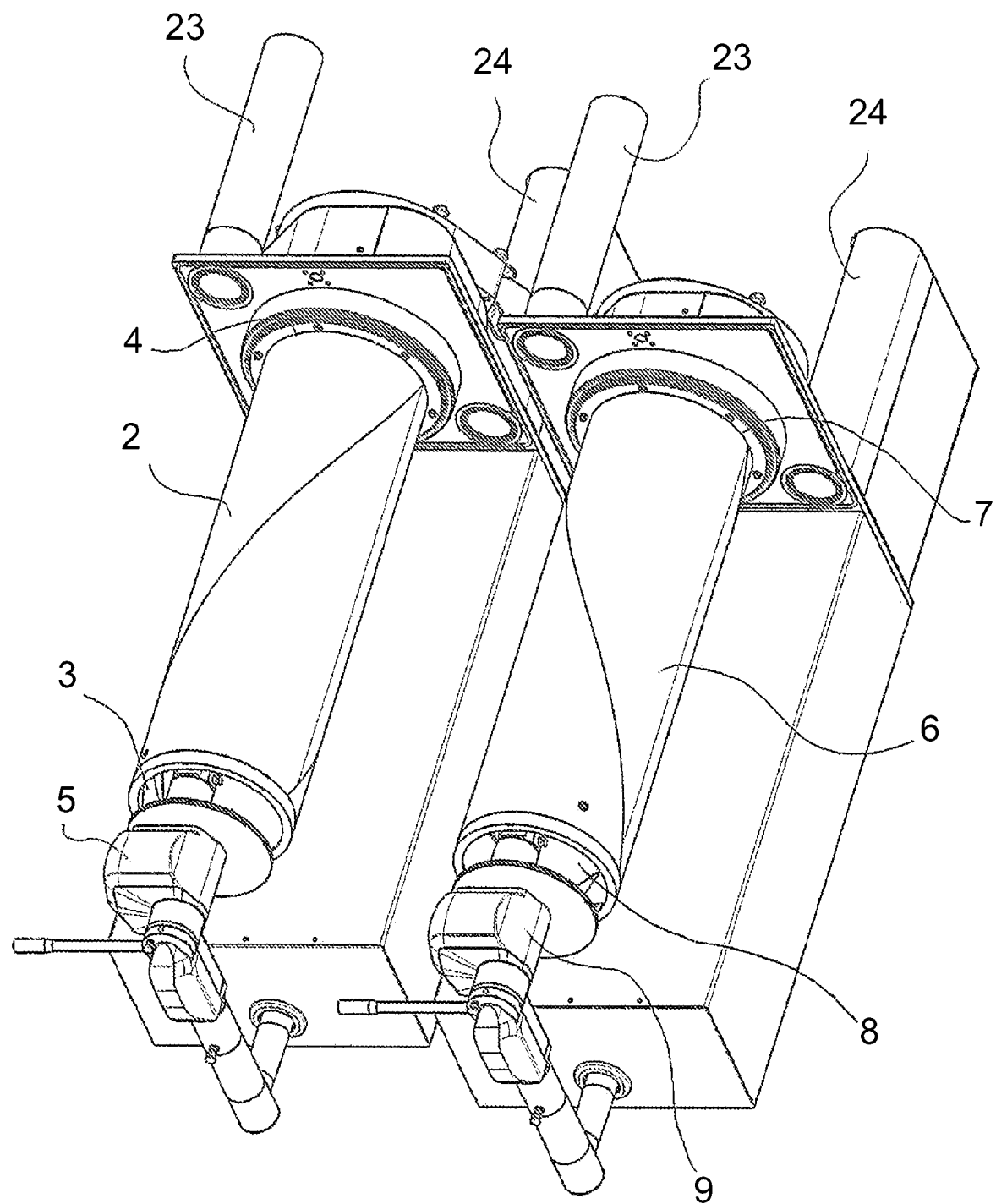
FIG. 4 is the view of the apparatus of FIG. 3 with certain parts removed to highlight other parts better.

The coating apparatus 1 may comprise, as in these embodiments, a discharge portion D (shown in FIG. 2) arranged to receive the bulk material M that exits from the second outlet 8 of the second rotating container 6 and to discharge the bulk material M outside. The discharge portion D (for example of known type) may be fixed to and contiguous with the end of the second container 6 where the second outlet 8 is situated. The discharge portion D may comprise a conveyor of the same type as the conveyor 10.

The coating apparatus 1 may comprise, as in this embodiment, a second dispensing device 9 (for example of known type) for dispensing coating material (that may be the same type of material dispensed by the first dispensing device 5 in the first container 2 or a material of different type) on the bulk material M contained in the second container 6. The second dispensing device 9 may comprise, in particular, one or more nozzles arranged (aligned) inside of the second container 6 to spray the coating material.

The first inlet 3 of the first container 2 and the second outlet 8 of the second container 6 (thus like the supply portion A and the discharge portion D) are arranged on the same side of the apparatus, in particular on a front side where an operator workstation is situated. In other embodiments, it is possible to load the bulk material on a behind or rear side, transfer the material to an opposite, frontal or forward side (operator side) and then discharge the material onto the behind or rear side.

In this specific embodiment, the bulk material M in transit in the first container 2 from the first inlet 3 to the first outlet 4 moves in a certain direction, whereas the bulk material M in transit in the second container 6 from the second inlet 7 to the second outlet 8 moves in a direction substantially opposite the aforesaid direction in the first container 2.

The coating apparatus 1 comprises a conveying device arranged to convey the bulk material from the first container 2 to the second container 6.

This conveying device may comprise, in particular, a conveyor 10 configured for removing at least one part of the bulk material M exiting the first container 2, The conveyor 10 may be configured, in particular, for removing the bulk material M at a certain (lower) level and then lift the bulk material M to a higher level, to then discharge the hulk material M to the second container 6, In other embodiments, another conveyor, identical to the conveyor 10, may be applied, if necessary, to the discharge of the second container 6, Le, near the second outlet 8, to remove at least one part of the bulk material M exiting the second container 6.

The conveyor 10 may comprise, in particular, at least one rotating element 11 that rotates around a rotation axis X one or more removal portions 12 each of which is arranged to remove bulk material M from the aforesaid lower level and then lift the bulk material M to the aforesaid higher level. Each removal portion 12 is shaped so as to define a containing chamber containing a quantity of bulk material M.

The rotating element 11 may rotate around a rotation axis X that is distinct and driven independently of the first rotation axis X1 around which the first container 2 rotates. The rotation axis X of the rotating element 11 may be, in particular, but not necessarily, parallel (or coaxial, as in this specific embodiment) to the first rotation axis X1 of the first container 2.

Each removal portion 12 is configured for performing, at each rotation of the rotating element 11, a removal of a quantity of bulk material M. In the specific case the rotating element 11 may comprise a plurality of removal portions 12 that are arranged on a periphery of the rotating element 11 angularly spaced apart from one another.

In the embodiment disclosed here, the conveyor 10 comprises at least one removal portion 12 arranged on a rotating element 11, so that the removal portion 12 is movable along a circular trajectory.

It is possible to provide other embodiments (which are not illustrated) in which the conveyor 10 comprises at least one removal portion 12 that is movable along a closed loop path, which is not necessarily circular (for example defined by a flexible conveying element, such as a belt or a chain), in which it may adopt at least one lower position, in which it removes the bulk material M from a lower level, and at least one upper position, in which it discharges the bulk material M to a higher level. In other embodiments, it is possible for each removal portion to be commanded to perform an open trajectory, in particular with an outward and return motion, in which the removal operation may be performed (only) during the outward or during the return motion.

The rotating element 11 may be arranged, as in this embodiment, opposite and contiguously to an end of the first container 2 from which the bulk material M exits. The rotating element 11 may comprise, as in this embodiment, a rotating cylindrical body (coaxial with the first container 2) that supports the various removal portions 12.

Each removal portion 12 may be, as in this embodiment, in the shape of a container (drawer, socket, spoon, etc) configured for containing a quantity of bulk material M. Each removal portion 12 may comprise at least one (movable) wall 13, for example in form of a blade, that bounds at least in part the containing chamber of the bulk material M.

The rotating element 11 may rotate around the rotation axis X selectively in a first rotation direction and in a second rotation direction that is opposite to the first one.

The movable wall 13 may be tilted so as to remove the bulk material M from the aforesaid lower level when the rotating element 11 rotates in a first rotation direction (that is the same as the rotation direction of the first container 2 around the first rotation axis X1).

Figure 5:
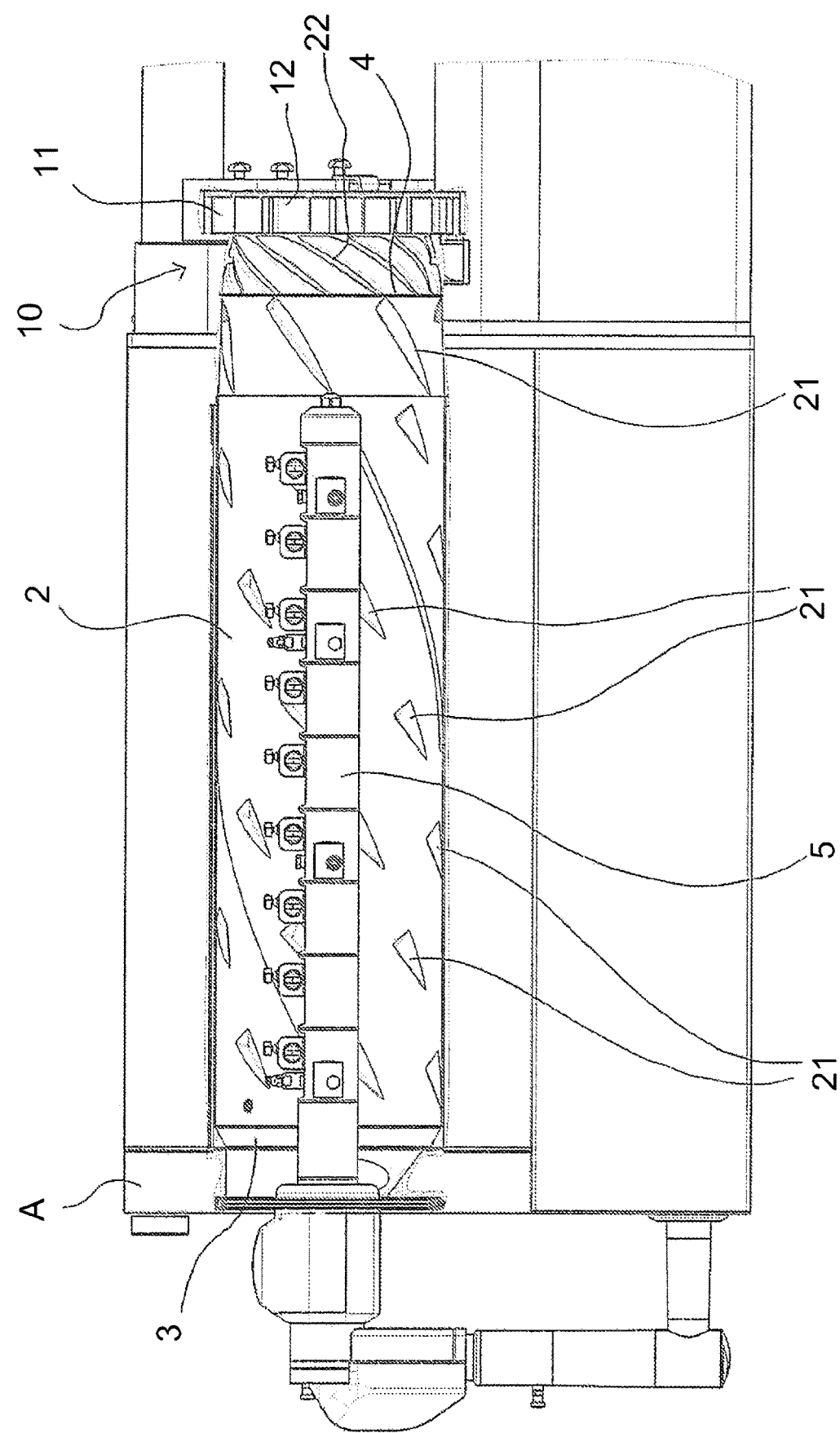
FIG. 5 is a section on a vertical plane of the first rotating container of the apparatus of FIG. 3.
Figure 6:
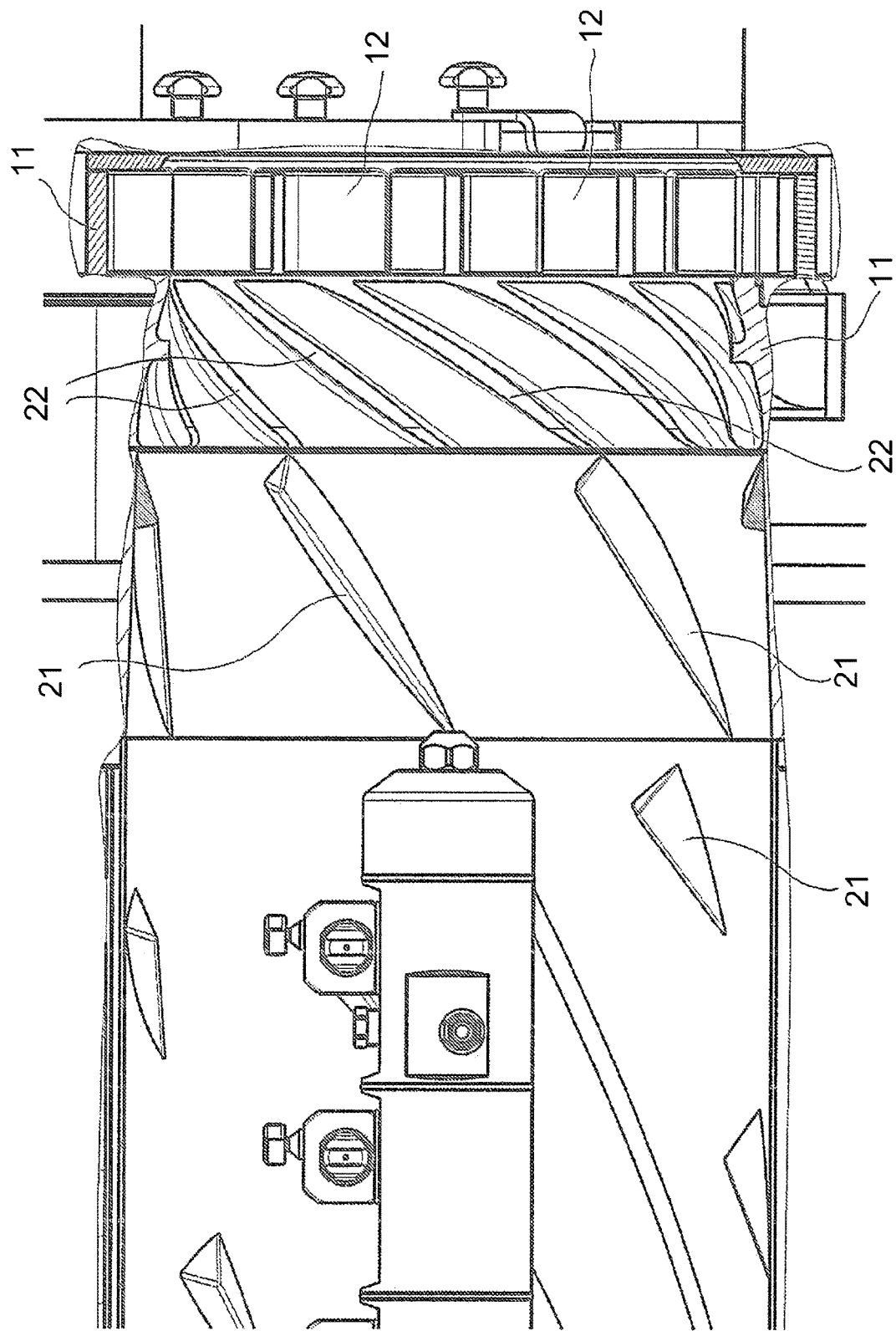
FIG. 6 shows an enlarged detail of FIG. 5.
Figure 7:
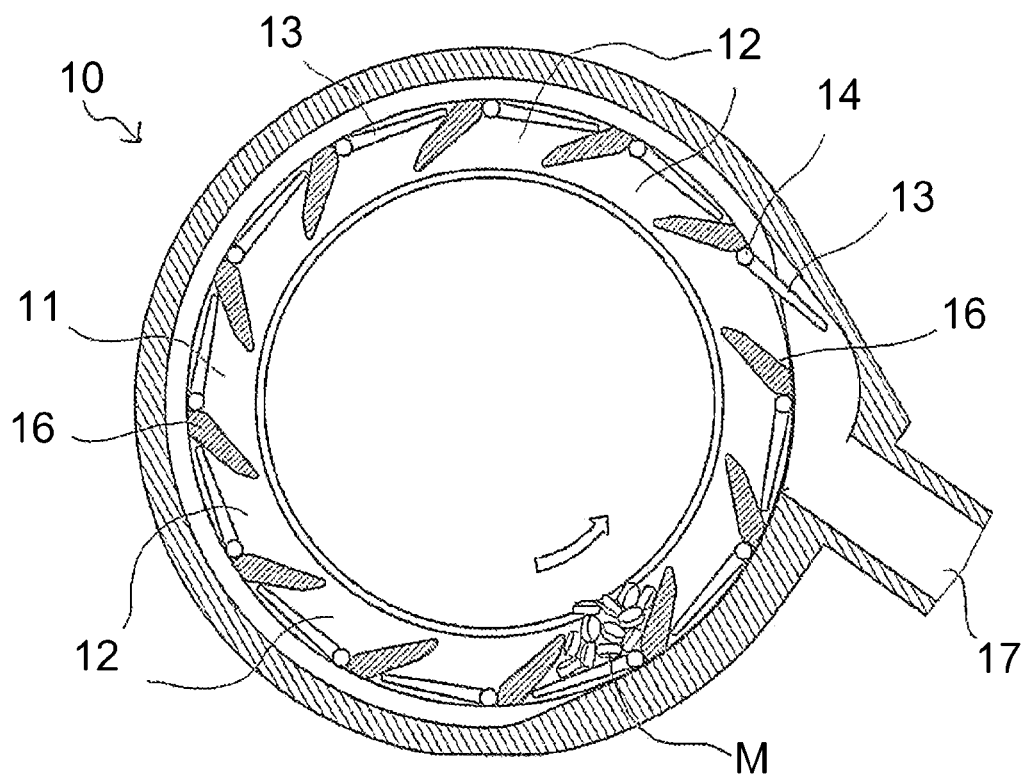
FIGS. 7 to 10 are frontal views in a vertical elevation of some operating steps of a removing portion of the apparatus in FIG. 3 from the bulk material removal step to the bulk material discharging step.
Figure 8:
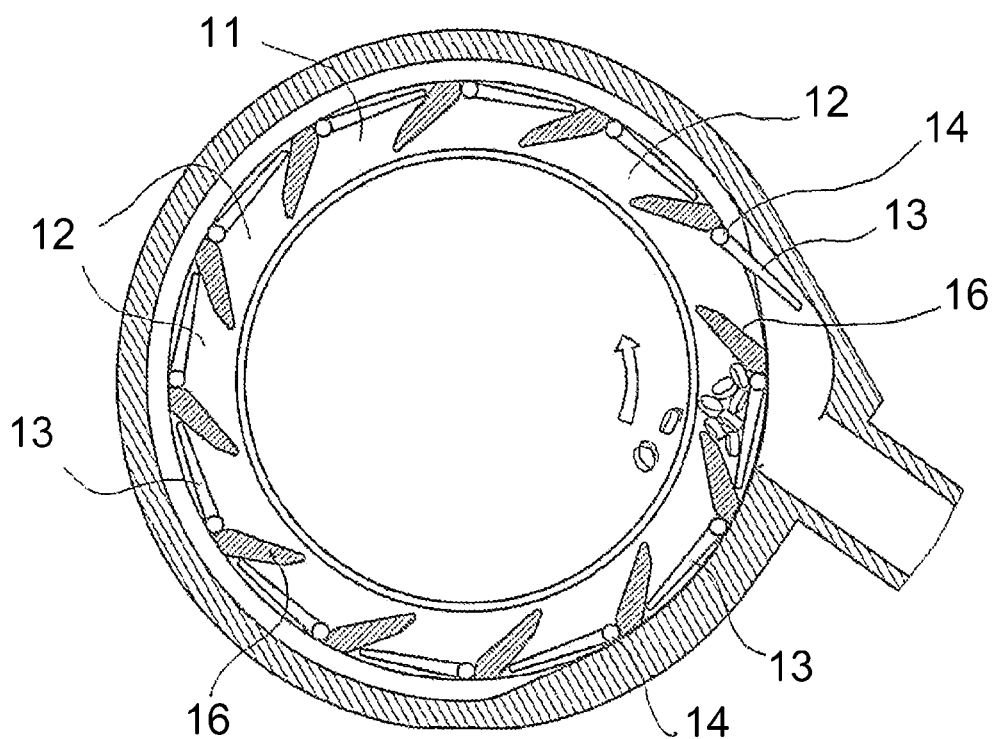
Figure 9:
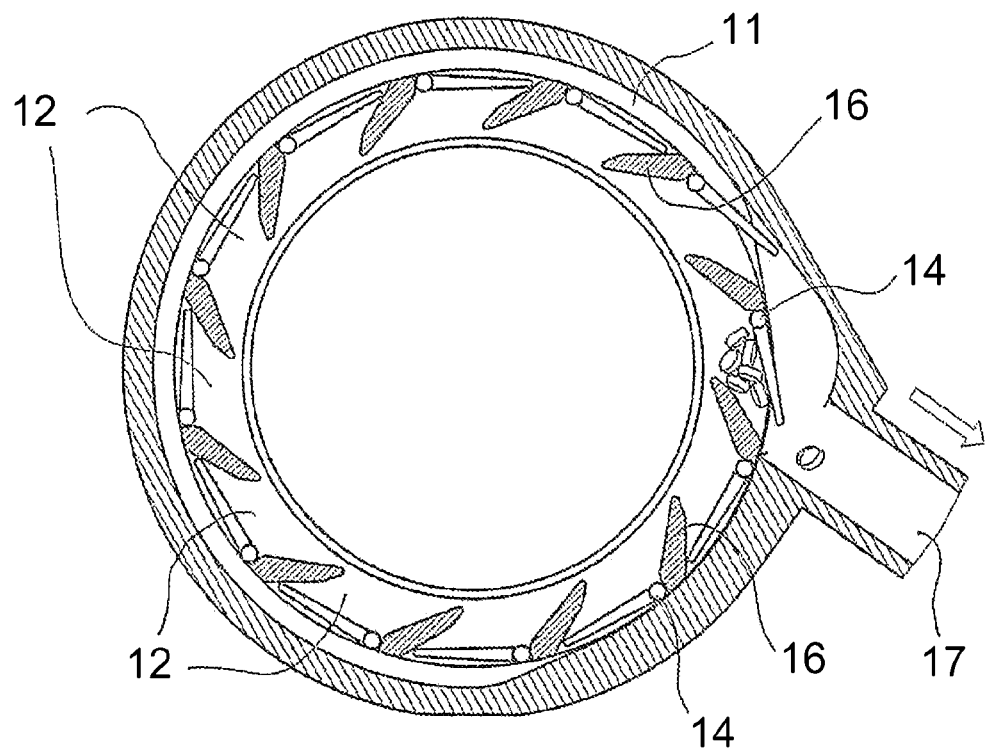
Figure 10:
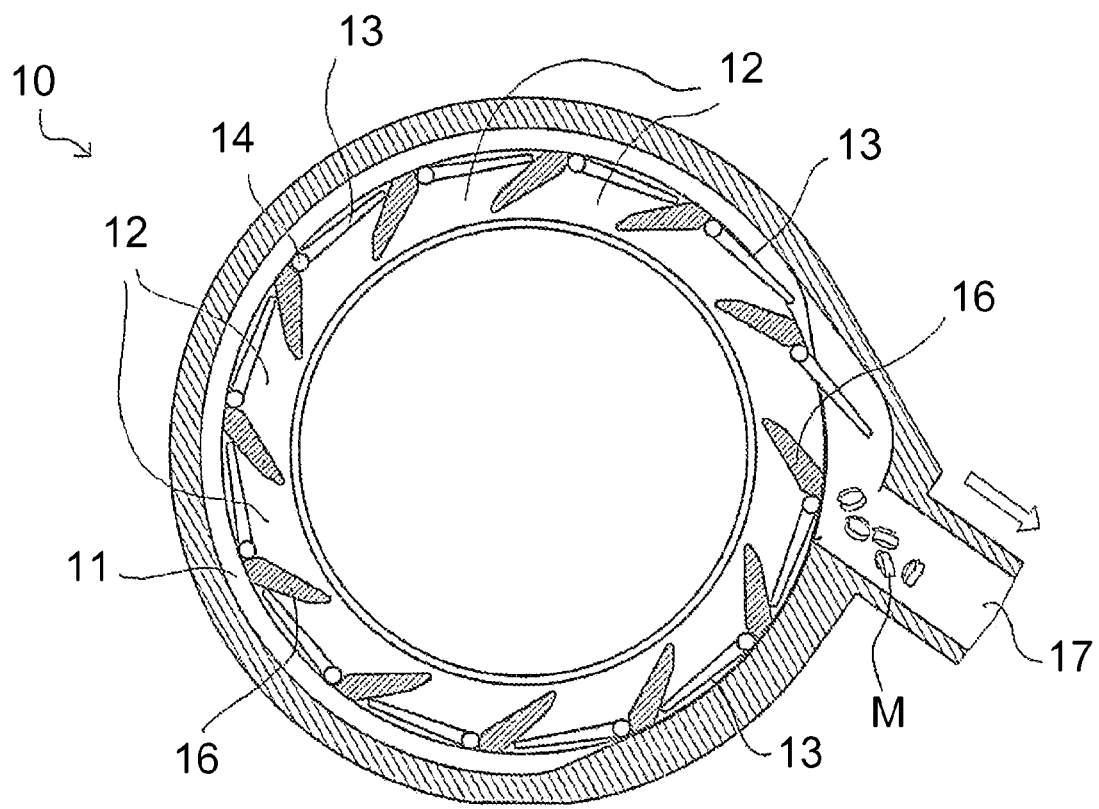

The rotating element 11 (cylinder) may include, for example as in FIGS. 5 and 6, a plurality of blades 22 arranged in front of the removal portions 12, with reference to the advancement direction of the bulk material (tablets). The blades 22 are arranged circumferally around the axis of the rotating element 11, forming a crown of blades that operate on the bulk material. The blades 22 may be tilted with respect to the rotation axis of the element 11. The blades 22 are shaped and arranged in such a manner as to push back or facilitate the flow of the material, according to the rotation direction of the element 11. In particular, the blades 22 are tilted so as to push back at least partially the bulk material M to the inside of the first container 2 when the rotating element 11 rotates in a second rotation direction (opposite the first rotation direction and contrary to the rotation direction of the first container 2 around the first rotation axis X1). By considering the flow of the bulk material M that exits the first container 2, the material first meets the system of blades 22, that is suitable for obstructing or facilitating the flow of the material according to the rotation direction, then meets the system with the removal portions 12 (containing chambers), that has similar behaviour as each removal portion 12, rotates in a direction opposite the first container 2 and, vice versa, removes the material when the element 11 rotates in the same direction as the first container 2.

Each removal portion 12 may comprise, in particular, at least one removal opening of the bulk material M and at least one discharge opening of the bulk material M. The removal opening may be arranged, as in this embodiment, with a prevalently axial orientation (facing inside of the first container 2). The discharge opening may be arranged, as in this embodiment, with a prevalently radial (outwardly facing) orientation. The terms "axial" and "radial" must be understood to refer to the rotation axis X of the rotating element 11, or to the first rotation axis X1 of the first container 2.

The aforesaid wall 13 of the removal portion 12 may act as a blade, i.e. as a tool for removing the bulk material M, and may comprise a flat body, possibly curved or concave.

The aforesaid wall 13 (mobile, in particular closable and openable) of the removal portion 12 may act, substantially, as a shutter member with the possibility of adopting a closed position in which it closes the discharge opening, when the removal portion 12 is in the lower level, and an open position in which the discharge opening opens, when the removal portion is in the upper level.

The coating apparatus 1 may comprise, in particular, an actuating arrangement, for example of the cam type, arranged to move the movable wall 13 (shutter) between the closed and open positions. The wall 13 may be movable between the closed and open positions by rotating around a fulcrum 14. In particular, the movement of the movable wall 13 may be guided by a cam element comprising a fixed cam profile engaged with a pin that is slidable and integral with the movable wall 13. During the rotation of the rotating element 11, the coupling between the pin and the cam profile causes the opening movement (rotation around the fulcrum 14) of the movable wall 13 in the discharge zone of the bulk material M at the aforesaid upper level and the closing movement of the wall 13 once the bulk material M has been discharged. The cam profile may be engaged with a plurality of pins, one for each removal portion 12.

Each removal portion 12 may comprise a side with a (fixed) wall 16 tilted in such a manner that, when the movable wall 13 opens (at the upper position in the release zone), the exit of the bulk material M from the removal portion 12 is promoted by the force of gravity. The exit of the bulk material M from the removal portion 12, when the movable wall 13 opens, may be promoted by a centrifugal force due to the rotation of the rotating element 11 and/or by an aerodynamic force due to the movement of air generated by the opening of the movable wall 13. The (fixed) wall 16 bounds the containing chamber of the bulk material M.

The conveying device may comprise, in particular, at least one chute 17 arranged to convey the hulk material NI coming from the conveyor 10 to the second container 6 (in particular through the supply portion 15 arranged on the second inlet 7). The chute 17 may be arranged to receive the bulk material M discharged from the various removal portions 12 when the latter reach the release zone of the material at the aforesaid upper level.

The coating apparatus 1 comprises a motor device 18 for driving the conveyor 10, in particular for rotating the rotating element 11. The coating apparatus 1 may further comprise a first motor device 19 for rotating the first container 2 and a second motor device 20 for rotating the second container 6. The motor device 18 of the conveyor 10 may be distinct from and adjustable independently of the first motor device 19 and of the second motor device 20. The first motor device 19 may be distinct from and adjustable independently of the second motor device 20.

The first container 2 may comprise, as in this embodiment, a series of tilted ridges 21 (in other embodiments the ridges could also not be tilted) that protrude radially inside from the inner surface of the first container 2 (in particular arranged near the first outlet 4) and that act as deflectors or blades for moving the bulk material M.

The operation of the apparatus 1 is disclosed below.

In this specific embodiment, the coating apparatus 1 works continuously, so that there is a stationary work step in which the bulk material M moves without interruptions, from a loading zone where the bulk material M enters the first container 2 (enters through the first inlet 3, first passing through the fixed supply portion A), to a final discharge zone where the bulk material M exits the second container 6 (exits through the second outlet 8 to then be discharged outside by passing through the fixed discharge portion D, or, in other embodiments, passing through a conveyor identical to the conveyor 10). In the stationary production step, the mass flow rate of the bulk material M that traverses the apparatus 1 is (approximately) constant, so that the flow rate of material that enters the supply portion A and thus the first container 2 is (approximately) the same as the flow rate that exits the second container 6 and thus the discharge portion D.

In stationary operation, the bulk material M (tablets) is introduced (in a known manner) into the first container 2 through the first inlet 3. The first container 2 rotates continuously at a desired rotation speed (controlled by a programmable electronic control device) around the first rotation axis X1 so as to handle (convey and mix) the bulk material M, whilst the first dispensing device 5 sprays the coating material onto the bulk material M. The continuous rotation of the first container 2 promotes the transit of the bulk material M towards the first outlet 4 of the first container 2. A flow of process gas (treated air) is pushed in a forced manner from the outside to the inside and then from the inside to the outside, passing through the holes and the mass of the tablets, both for the first container 2, and for the second container 6.

In the stationary phase (or first phase), the rotating element 11 rotates in a given rotation direction around the rotation axis X, in particular in a rotation direction in accordance with rotation direction of the first container 2, at a continuous rotation speed (regulated by the programmable electronic control device) that may be different from (for example lower than) the (continuous) rotation speed of the first container 2, set at a value that is such as to maintain correctly the stationary condition, on the basis of the flow rate of the bulk material M, at the dwell time of the bulk material M in the first container 2, at the flow rate of the coating material, and at the other (known) process parameters.

During the rotation of the rotating element 11, each single removal portion 12 collects (with the movable wall 13 in closed position), at each revolution of the rotating element 11, a certain quantity of bulk material M, exiting the first container 2 at the lower level (in the removal zone), retains the bulk material M by lifting the bulk material M as far as upper level, where the movable wall 13 receives the opening command (owing to the cam element) to enable the bulk material M (in the release zone) to be discharged. The bulk material M is discharged towards the chute 17 by a combined effect of centrifugal force, force of gravity and aerodynamic force.

In FIGS. 7 to 10 four moments are illustrated in sequence of the lifting step of the bulk material M starting from the removal zone (lower level) until to the release zone (upper level).

After which the bulk material M, which has been discharged from the removal portion 12 in the release zone, slides on the chute 17 until it enters the second container 6 (through the supply portion 15 and the second inlet 7), then transits in the second container 6 where it can be further processed (for example sprayed with coating material by the second dispensing device 9), in order to then exit the second container 6 (through the second outlet 8) and lastly be discharged outside through the discharge portion D.

There are also two transitional work steps, a start or filling step, starting from a state in which the containers 2 and 6 are empty until the stationary production state, and a switch-off or emptying step, in which the opposite occurs.

In the initial transition phase, the rotating element 11 may rotate around the rotation axis X in a rotation direction that is opposite the rotation direction of the stationary phase, in particular a rotation direction that is opposite the rotation direction of the first container 2 around the first rotation axis X1, so as to obstruct the exit of the bulk material M and promote (accelerate) reaching a desired level of material inside the first container 2, Whilst the level of the bulk material M increases in the first container 2, the rotation speed of the rotating element 11 may be regulated (by the programmable electronic control device) so as to move the material in the desired manner. It is possible to regulate the rotation of the rotating element 11 by passing gradually from one rotation direction (opposite the first container 2) to the opposite rotation direction (in the same direction as the first container 2), checking the first container 2 so that it always rotates in the same direction. Once the desired conditions have been achieved (for example the desired quantity of bulk material NI in the first container 2), the stationary phase can start. During this initial start transition phase, the conveyor 10 promotes filling of the first container 2, obstructing and/or stopping the transfer downstream of the bulk material M, in particular owing to the reverse rotation of the rotating element 11.

The rotating transfer element 11 may be provided, as in this embodiment, with a plurality of tilted blades 22 for promoting the transfer of the bulk material M when the rotating element 11 rotates in one direction (in the same direction as the rotation of the first container 2) and for pushing back the bulk material M when the rotating element 11 rotates in the opposite direction (in the opposite direction to the rotation of the first container 2).

In the final transition phase, the rotating element 11 may rotate with a rotation direction in the same direction as the rotation direction of the first container 2 and at a rotation speed that is greater than or the same as that which it had in the stationary phase, so as to facilitate/accelerate the emptying of the first container 2, even without damaging the bulk material M.

The ratio of the rotation speeds of the rotating element 11 and of the first container 2 may be variable, changing from the initial transition phase to the stationary phase and thus changing from the stationary phase to the final transition phase, and may be programmed in the electronic control device of the coating apparatus 1.

The invention in question permits a very delicate transfer of the bulk material (pharmaceutical tablets or other items) from one rotating container to the next one, preserving the bulk material that has just been processed (coated) with significant efficacy.

The bulk material is transferred by making it perform a movement that at least in part comprises a lifting or raising of level, from the outlet of a rotating container and before reaching the next rotating container. This lifting, enables, amongst other things, the two rotating containers to be arranged at two positions that are not very different from one another (or are even at the same position), thus limiting the vertical dimension of the apparatus overall. It is possible, in other embodiments that are not illustrated, that the second rotating element (downstream) is arranged at a position that is higher than the first rotating element (upstream).

The inlet of the material to be processed into the apparatus (fixed supply portion A and first inlet 3 of the first rotating container 2) and the outlet of the processed material from the apparatus (second outlet 8 of the second rotating container 6 and fixed discharge portion D) are arranged on the same (front) side of the apparatus, with consequent ease and practicality in the control of the apparatus by an operator, although in other embodiments the inlet of the material to be processed and the outlet of the processed material can be arranged on different sides of the apparatus.

Further, in this specific embodiment, the level (in a vertical elevation) of the inlet of the material to be processed and the level of the outlet of the processed material have a relatively reduced difference; in other embodiments (which are not illustrated) the difference in level between the inlet and outlet could be even more reduced. This minimum difference in level enables the facility and practicality of the control for an operator to be further improved.

The coating apparatus 1 disclosed above is designed for continuous production, but it is also possible to provide coating apparatuses that are suitable for discontinuous ("batch" mode) production. In an apparatus that is suitable for working in "batch" mode, for each rotating container a work cycle will be provided that comprises a bulk material loading step in which the rotating container is filled with the desired quantity of material, a work step in which the aforesaid quantity of material is coated with the coating material remaining inside the container, and a discharge step in which the rotating container is emptied completely.

Also in "batch" mode, a conveyor or lifter may be arranged between the first container and the second container in such a manner as to maintain or raise the level of the bulk material that exits the first container, during the step of transferring the material from the first to the second rotating container.

It has been seen that the apparatus in question enables the bulk material that exits a rotating container to be removed, retained and raised in level before introducing the material into the next rotating container. This enables an apparatus to be made that comprises several serially arranged rotating containers and has significant operating versatility and flexibility, relatively compact dimensions and good ergonomics. These features may be improved further by arranging, as said, another conveyor, similar to the conveyor 10, also at the second outlet 8 (outlet of the second container 6).

The aforesaid conveyor or lifter that raises the level of the material can be useful during the start step of the apparatus, in which the apparatus is empty and starts to receive the flow of material to be coated, to stop or temporarily slow this flow of materials so as to form a minimum layer of material, which is a necessary condition for the start of the coating step (spraying of the coating material). This may be achieved, as seen, by moving the conveyor or lifter in a direction opposite the movement direction that will be used in the stationary phase.

The coating apparatus may be constructed in a modular manner, by combining appropriately the number and/or the arrangement of the rotating containers and of the conveying device that transfer the bulk material from one container to the other, easily adapting the apparatus to different productive needs.

In the embodiment disclosed here, the coating apparatus 1 comprises two rotating containers (first and second containers 2 and 6) arranged serially one after the other. It is possible, in other embodiments that are not illustrated, to provide apparatuses comprising a different number (three, four or more) of rotating containers arranged serially one after the other. The bulk material M may be conveyed from the second container 6 to a third rotating element, lifting the bulk material exiting the second container 6 from a lower level to an upper level so that the bulk material M reaches the third container; the same may occur from the third to a fourth container, and so on.

The possibility of arranging several containers serially to process the bulk material enables a modular apparatus to be created that has great flexibility and versatility, that is easily adaptable to varying of the process parameters, such as for example the flow rate of the bulk material to be processed, the dwell time of the bulk material in the apparatus, the type of bulk material to be coated or of coating material, etc.

Figure 14:
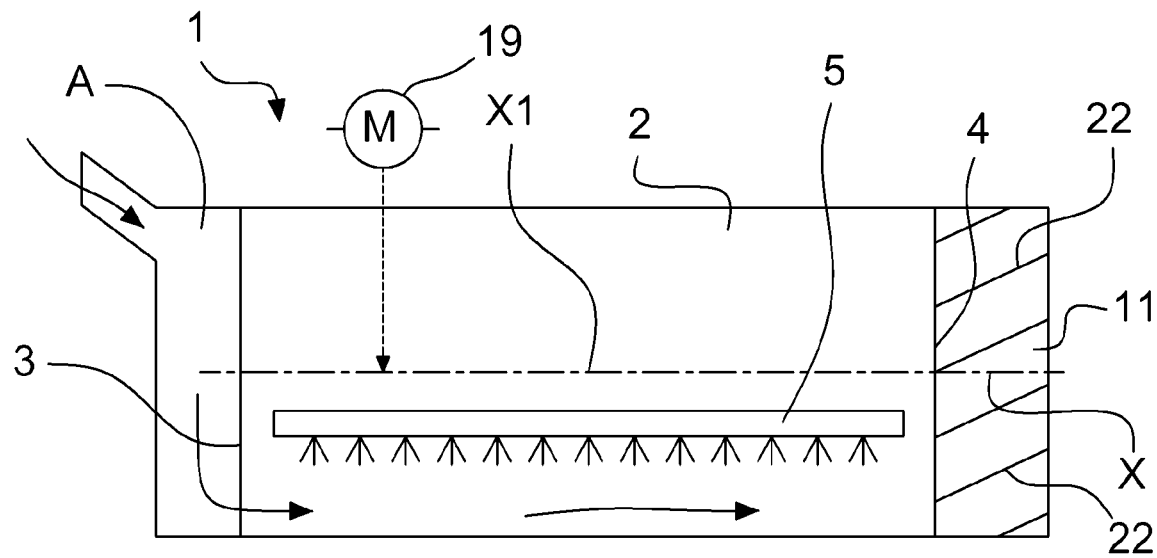
FIG. 14 is a side view of a diagram of another embodiment of a coating apparatus made according to the invention.
Figure 15:
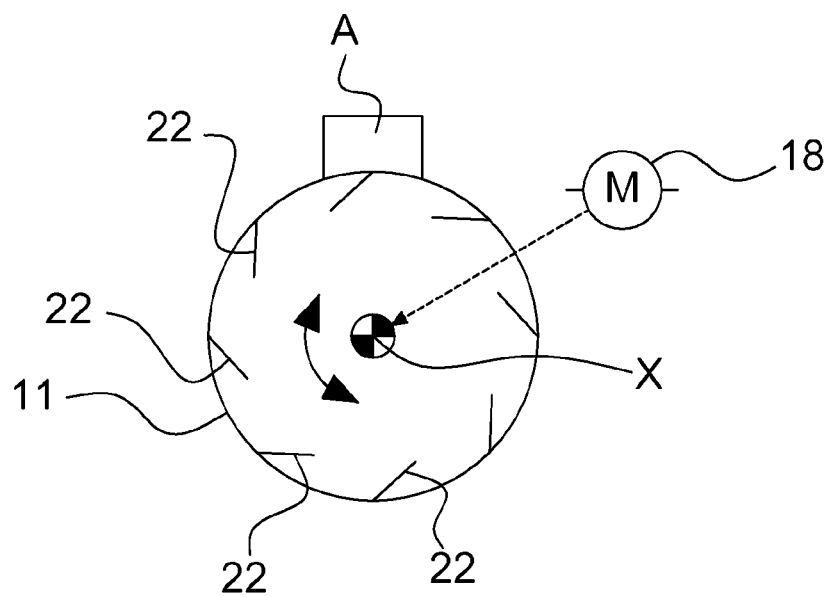
FIG. 15 is a view from the right of FIG. 14.
Figure 16:
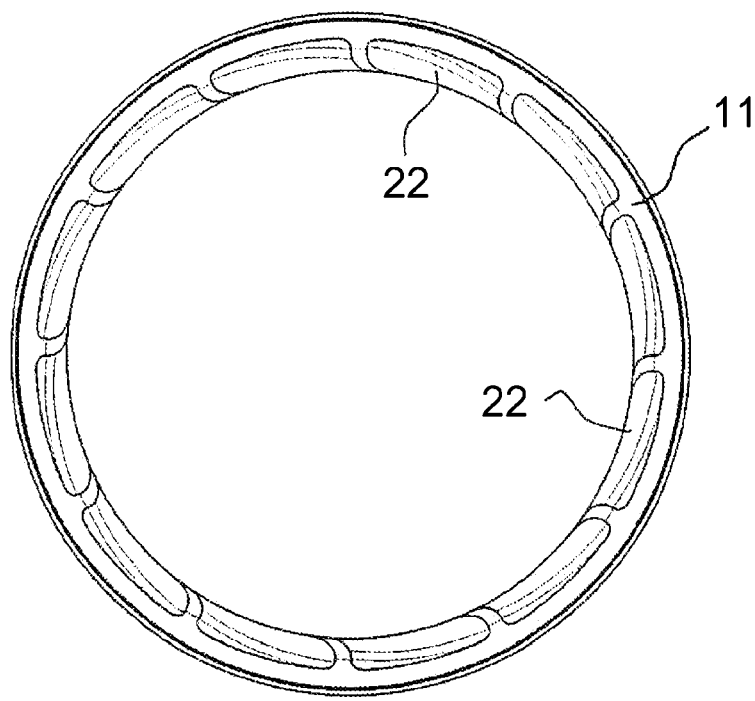
FIG. 16 is a side view of an annular regulating element that is usable in the apparatus of FIG. 14.
Figure 17:
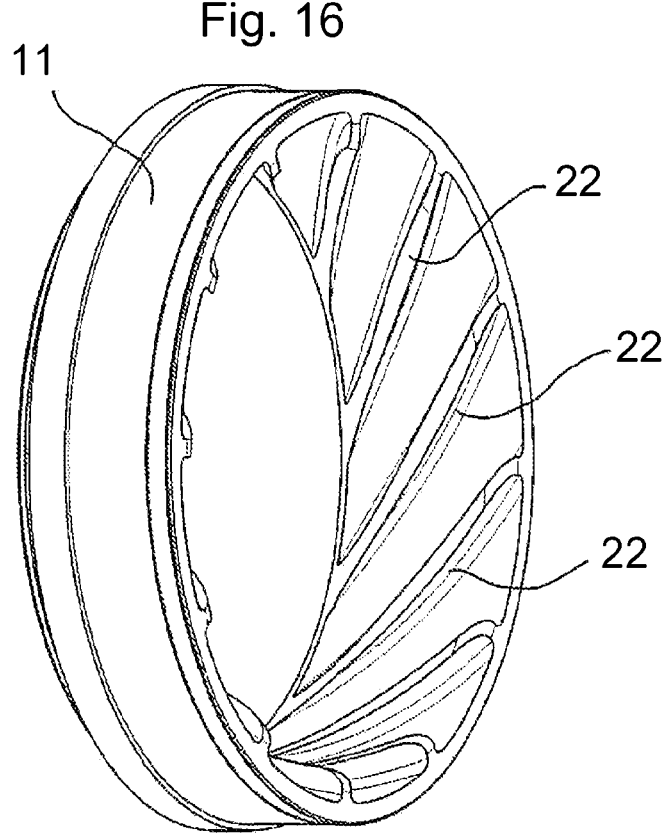
FIG. 17 is a perspective view of the element of FIG. 16.

In the coating apparatus shown in FIG. 14, the rotating element 11 is a regulating element arranged at the or near the second outlet end 4 to regulate the exit of the bulk material M from the container 2. In this embodiment the regulating element comprises a rotating (cylindrical) annular element 11 provided with a driving arrangement (the motor device 18) configured for rotating the annular rotating element 11 selectively in a first rotation direction and in a second rotation direction opposite the first. Such driving arrangement is programmed, in particular, for an operating mode, in a stationary phase, in which the annular element 11 is driven to rotate (with several rotation revolutions) in the first rotation direction at the same time as the rotation of the container 2, to permit the exit of the bulk material M from the container 2. Further, this driving arrangement is programmed, in particular, for an operating mode, in an initial transitional filling step, in which the annular element 11 is driven to rotate (with several rotation revolutions) in the second rotation direction at the same time as the rotation of the container 2, to retain the bulk material M inside the container 2 and thus form a bed of bulk material M until a desired level of material is reached. Thus, the annular rotating element 11 is actuatable in two opposite directions.

The aforesaid first rotation direction of the element 11 is in the same direction as the rotation of the container 2, whereas the second rotation direction is in the opposite direction to the rotation of the container 2. The element 11 may include a rotation axis X that is parallel to the longitudinal axis X1 around which the container 2 rotates. In particular, the annular element 11 is coaxial with the container 2. The annular element 11 comprises an inner surface that is shaped and arranged continuously with an inner surface of the container 2. The annular element 11 extends axially in length for a portion along the direction of the longitudinal rotation axis X1 of the container 2.

The aforesaid further driving arrangement (the motor device 18) may be programmed for another operating mode, in a final emptying transition phase, in which the annular element 11 is driven to rotate (with several rotation revolutions) in the first rotation direction (in the same direction as the container 2) during the rotation of the container 2, at a rotation speed that is greater than or the same as the aforesaid stationary phase, to facilitate evacuation of the material.

The inner surface of the element 11 has a plurality of portions (the blades 22) protruding inwardly and arranged to move the bulk material M. Such protruding portions extend in length and are arranged tilted with respect to the rotation axis X of the annular element 11. The tilt of the protruding portions (blades 22) is such as to promote the exit of the bulk material M from the container 2 when the annular element 11 rotates in the first rotation direction (stationary phase or final emptying transition phase) and such as to promote the retaining of the bulk material M inside the container 2 when the annular element 11 rotates in the second rotation direction (initial filling transition phase). The protruding portions, as said, are made in the shape of blades (for example helix-shaped).

The invention claimed is:

1. A coating apparatus comprising:
    a container which is tubular and is able to have rotation about a longitudinal axis in a rotation direction of said container so as to move a bulk material contained within said container and which comprises a first inlet end for receiving the bulk material and a second outlet end opposite said first inlet end to permit a discharge of the bulk material;
    a dispensing device arranged within said container and configured to dispense a coating material on the bulk material in said container; and
    at least one annular element arranged at or near said second outlet end and configured to regulate the discharge of the bulk material from said container;
    wherein said at least one annular element comprises an annular surface which is tubular and has a plurality of protruding portions which protrude from said annular surface towards the longitudinal axis and are configured to move the bulk material, said annular surface being coupled at the second outlet end of the container, and wherein said at least one annular element is actuatable to rotate in two opposite directions around a rotation axis of the at least one annular element independently of the rotation of said container, selectively in a first direction of rotation to allow exit of the bulk material from said container and in a second direction of rotation that is opposite to the first direction of rotation to prevent the discharge of the bulk material, said first direction of rotation of said at least one annular element being in a same direction as said rotation direction of said container and said second direction of rotation of said at least one annular element being opposite to the rotation direction of said container.

2. The apparatus according to claim 1, wherein said rotation axis of the at least one annular element is parallel to said longitudinal axis about which said container rotates; said at least one annular element being coaxial with said container.

3. The apparatus according to claim 1, wherein said at least one annular element is arranged facing said second outlet end with said annular surface that is conformed and arranged outside of said container in continuity with an inner surface of said container.

4. The apparatus according to claim 1, wherein said protruding portions are extended in length and arranged inclined with respect to the rotation axis of said at least one annular element, wherein the inclination of said protruding portions is such as to promote the discharge of the bulk material from said container when said at least one annular element rotates in said first direction of rotation and such as to facilitate the retention of the bulk material inside said container when said at least one annular element rotates in said second direction of rotation.

5. The apparatus according to claim 1, wherein said protruding portions are spiral-shaped blades.

6. The apparatus according to claim 1, wherein said at least one annular element extends axially in length along the direction of said longitudinal axis of rotation of said container.

7. The apparatus according to claim 1, wherein a driving arrangement is configured to operate in an emptying final transition phase in which the at least one annular element is rotated in said first direction of rotation during the rotation of said container, at a rotational speed that is greater than or equal with respect to a rotational speed of said first phase.

\* \* \* \* \*